Oct. 21, 1941.  B. L. HENRY  2,259,467
DEVICE FOR PRODUCING ARTICULATE SOUNDS
Filed Feb. 27, 1940  2 Sheets-Sheet 1

INVENTOR.
Beulah Louise Henry
BY Clark & Ott
ATTORNEYS

Oct. 21, 1941.   B. L. HENRY   2,259,467
DEVICE FOR PRODUCING ARTICULATE SOUNDS
Filed Feb. 27, 1940   2 Sheets-Sheet 2
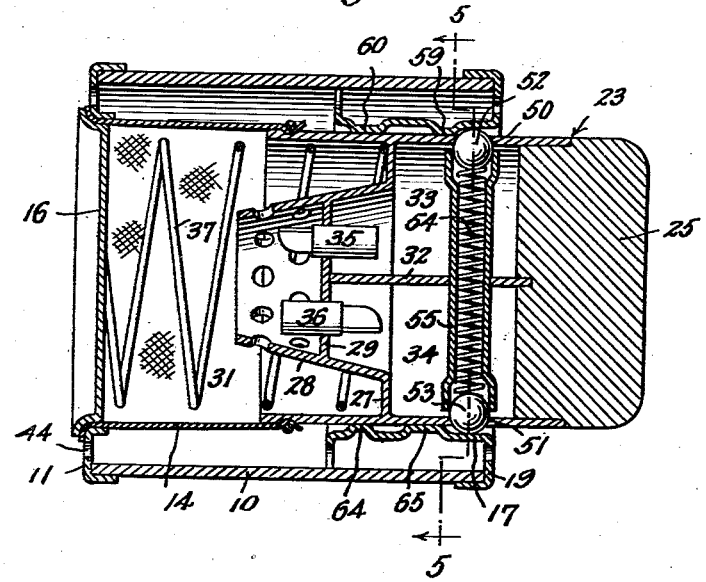
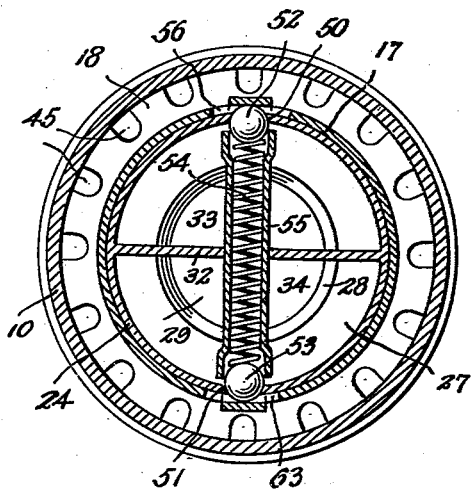
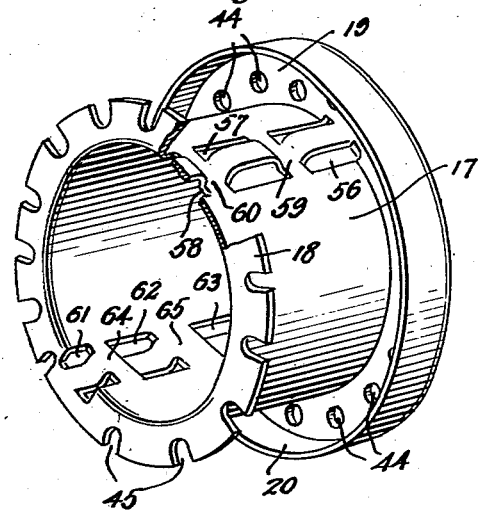
INVENTOR.
BY *Beulah Louise Henry*
*Clark & Ott*
ATTORNEYS Patented Oct. 21, 1941

2,259,467

UNITED STATES PATENT OFFICE 2,259,467

DEVICE FOR PRODUCING ARTICULATE SOUNDS

Beulah Louise Henry, New York, N. Y.

Application February 27, 1940, Serial No. 321,039

7 Claims. (Cl. 46—187)

This invention has to do with sound producing devices of the type which are utilized in dolls for emitting articulate sounds, such as "ma-ma" and "pa-pa."

The invention is broadly directed to an improved device of the indicated character which is so constructed and arranged as to effect the emission of an articulate sound or a succession of sounds upon movement of a movable member of the device in each of its directions of movement.

The invention further resides in an improved articulative sound producing device having relatively movable members which effect the passage of air through reversely arranged sounding reeds upon movement of said members in each of the opposite directions of movement.

More particularly the invention embodies relatively movable interfitted tubular members each having a closed outer end and in which the inner member is formed with an inner end wall having transversely spaced reversely arranged distinctively pitched sounding reeds with a partition extending longitudinally of said inner member and subdividing the same into a pair of sound chambers into each of which one of the reeds protrudes with a lateral air port in each sounding chamber, and means controlled by relative movement of said members in each of the opposite directions of movement for respectively effecting successive openings and closings of the air port of the sound chambers to effect the emission of articulate sounds of different characters upon relative movement of the members in said opposite directions of movement.

The invention further embodies in one of its forms, slidably interfitted tubular members each having a closed outer end and in which the inner member is formed with an inner end wall having transversely spaced reversely arranged distinctively pitched sounding reeds with a partition extending longitudinally of said inner member and subdividing the same into a pair of sound chambers each containing one of the reeds and each having a lateral air port with the outer member having longitudinally spaced sets of apertures of relatively different sizes which are designed to respectively cooperate with the air ports of the inner member to effect the emission of articulate sounds of different characters upon relative movement of the members in opposite directions.

As a still further object the invention in another of its forms resides in the provision of slidably interfitted members, one of which includes a pair of sound chambers each having a lateral air port and each having protruding thereinto sounding reeds which are reversely arranged with reference to each other, in combination with normally closed valve elements closing the air ports of the respective chambers and valve opening means on the other member effective upon movement of the members in opposite directions to respectively cause openings and closings of the air ports so as to effect the emission of articulate sounds of different characters upon relative movement of the members in opposite directions.

With the above enumerated and other objects in view, the invention is set forth in greater detail in the following specification and illustrated in the accompanying drawings in which:

Fig. 4 is a longitudinal sectional view through a sound producing device illustrating another form of the invention.

Fig. 5 is a transverse sectional view therethrough taken approximately on the line 5—5 of Fig. 4.

Fig. 6 is a perspective view of the tubular member.

Figure 1:
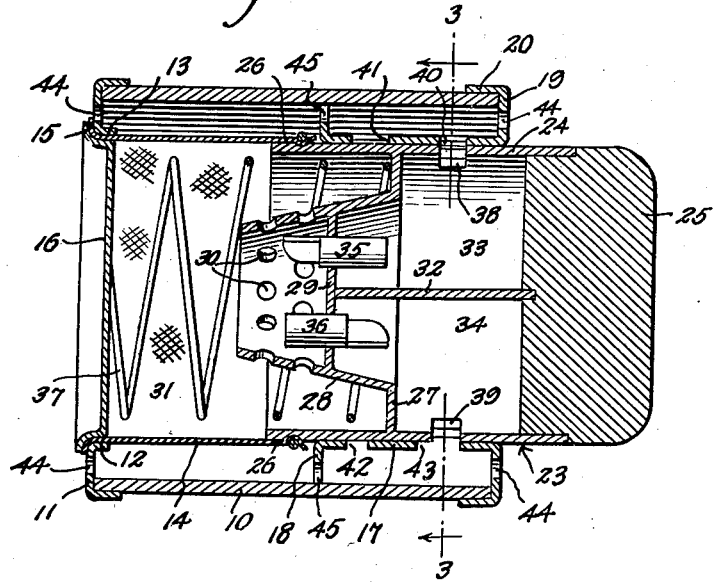
Fig. 1 is a longitudinal sectional view through a sound producing device constructed in accordance with one form of the invention.
Figure 2:
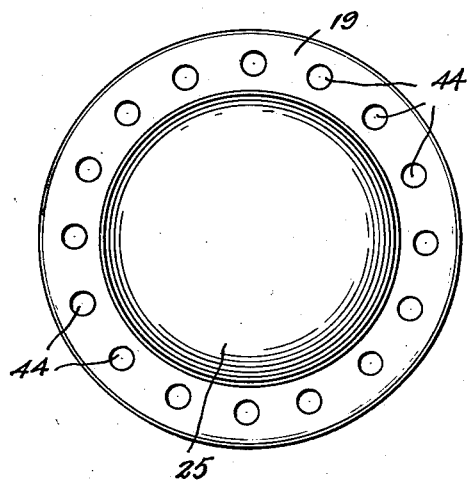
Fig. 2 is an end view thereof.
Figure 3:
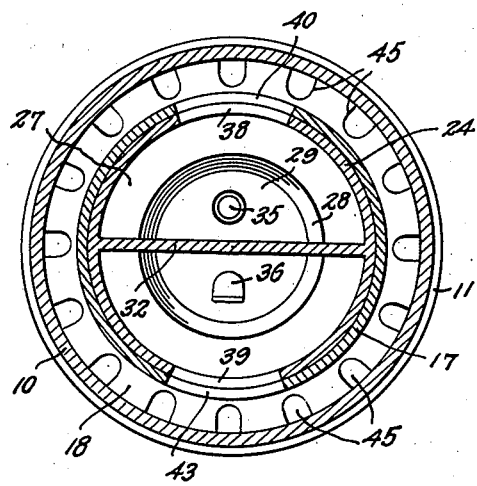
Fig. 3 is a transverse sectional view therethrough taken approximately on the line 3—3 of Fig. 1.

Referring to the drawings by characters of reference, 10 designates a tubular or preferably hollow cylindrical casing or housing of any suitable material such as paperboard, one end of which has fitted and secured thereover an annular rim provided with a central opening 12 defined by an inturned flange 13. A flexible tubing 14 of suitable air impervious material, such as rubber or rubberized fabric, is arranged within the casing or housing 10 and has its outer end 15 fitted within the flanged opening 12, turned outwardly and anchored and sealed in place by a cap 16 which is frictionally fitted within the outer end 15 of the tubing and within the flanged opening 12 of the rim 11 to close the end of the casing or housing.

The opposite end of the casing or housing 10 has arranged therein a tubular or hollow cylindrical element 17 preferably of sheet metal which is of a lesser length and diameter than the casing or housing 10 and which element is formed with an out-turned flange 18 at its innermost end and an out-turned rim 19 at its outermost end provided with an annular flange 20 telescopically fitted and secured over the casing or housing 10.

A plunger, designated generally by the reference character 23 includes a tubular or hollow cylindrical body 24 which is slidably interfitted in the tubular or hollow cylindrical element 17 and is preferably formed of sheet metal. The outer end of the plunger body 24 has secured therein a closure and manipulating head 25, while the inner end thereof has secured in surrounding relation thereto the innermost end 26 of the flexible tubing 14 which is suitably sealed in place. The plunger body 24 has secured therein, adjacent to but spaced from its inner end, an internal annular wall 27 from the inner edge of which a hollow frusto-conical or inwardly tapered flange 28 extends rearwardly. A transverse wall 29 is located with the plane intermediate the ends thereof and the rearwardly protruding portion of the flange is formed with perforations 30. This construction and arrangement provides a pressure chamber 31 within the tubing 14 between the cap 16 and the flanged wall 28 and transverse wall 29. Extending longitudinally of said plunger body 24 is a diametrically disposed partition 32 which is sealed against the transverse wall 29 and within the slotted inner face of the plunger 25 to subdivide the interior of the plunger into sound chambers 33 and 34. Sounding reeds 35 and 36 which are preferably distinctively pitched extend through the transverse wall 29 of the plunger and are reversely arranged.

A coiled expansion spring 37 of comparatively light tension is located within the flexible tubing 14 with its opposite end convolutions respectively bearing against the inner side of the cap 16 and the internal annular wall 27 of the plunger 23 respectively to normally urge the plunger outwardly to the limit of its movement which is controlled by the distention of the flexible tubing 14. The tubular body 24 of the plunger is provided with diametrically disposed air ports 38 and 39 which respectively open into the sound chambers 33 and 34, while the tubular element 17 is formed with diametrically disposed longitudinal spaced pairs of air ports 40 and 41, and 42 and 43. The annular rims 11 and 19 are provided with a series of circumferentially spaced sound outlet openings 44, and the flange 18 with sound passage notches 45.

In use, the device which is preferably mounted in a doll with the casing or housing 10 thereof in fixed relation thereto and with the plunger head 25 exposed, is operated by pressing the plunger 23 inwardly against the tension of the spring 37. This builds up an air pressure within the pressure chamber 31 which acts on the reed 35 to produce a sound through the initially registered air ports 38 and 40, and which sound is interrupted and again emitted as the air port 38 registers with the air port 41 giving a succession of articulated sounds such as "ma-ma" which are emitted from the body or housing 10 through the sound outlet openings 44. When the plunger 23 is released after reaching the innermost limit of its movement, which is controlled by the engagement of the innermost end edge of the conical flange 28 with the cap 16, the spring 37 will exert a tension to move the plunger outwardly thus drawing air through the reversely disposed reed 36 into the pressure chamber 37 to emit a sound from the reed 36, which is articulated through the successive registrations of air port 39 of the sound chamber 34 with the air ports 42 and 43 of the tube 17. This produces a succession of articulated sounds which preferably, due to the distinctive pitch of the sounding reed 36 and a variation in the proportion of the slots 42 and 43 with reference to the slots 40 and 41, will produce different articulated sounds from those caused by the inward movement of the plunger, such as "pa-pa."

While the device has been illustrated and described as manually operable by means of a spring urged plunger, it is to be understood that within the scope of the invention the spring may be eliminated and the plunger may be formed of a heavy material so that the device may be gravity operated by tilting the same in opposite directions.

The form of the invention illustrated in Figs. 4 and 5 of the drawings closely follows that of the previous form with the exception that in this instance the air ports 50 and 51 of the plunger 23 are of substantially conical formation flaring inwardly and are normally closed respectively by spherical valves 52 and 53 seated thereagainst and protruding partially therethrough under the influence of a coiled expansion spring 54 which is housed in a tube 55 extending through the partition 32 perpendicular to the plane thereof.

In this form of the invention, the hollow cylindrical element 17 is formed with a longitudinally extending series of slots 56, 57 and 58 along one side thereof with a web 59 between the slots 56 and 57 and with the web 60 between the slots 57 and 58. A diametrically disposed series of longitudinally extending slots 61, 62 and 63 are formed along the opposite side of said element 17 with a web 64 disposed between the slots 61 and 62 and with a web 65 between the slots 62 and 63.

In this form of the invention, as the plunger 23 is pressed inwardly against the tension of the spring 37, the spherical valve 52 engages the web 59 thereby camming the valve inwardly to open the air port 50 as the pressure within the pressure chamber 31 sounds the reed 35. As the plunger 23 is moved further inwardly beyond the web 60 and into registry with the slot 57, the valve 52 is urged outwardly by the spring 54 to close the air port 50 thus interrupting the sound emitted by the reed 35. Continued inward movement of plunger 23 causes the valve 52 to engage the web 60, thereby camming the valve 52 again to open relation to the air port 50 to permit escape of the sound emitted by the reed 35. After the valve passes beyond the web 60, it is again urged outwardly by the spring 54 as it aligns with the slot 58 thus again closing the air port. At this point the plunger reaches the inner limit of its movement due to the engagement of the inner edge of the flange 28 with the cap 16. Under this construction and arrangement it is evident that the inward stroke of the plunger effects the emission of an articulated series of sounds such as "ma-ma" caused by the sounding of the reed 35 and the combined action of the valve 52 successively opening and closing the air port 50 of the sound chamber 33. When the plunger is released and moved outwardly under the influence of the spring 37 so that air is drawn into the pressure chamber 31 from the sound chamber 34 through the reversely directed reed 36, the spherical valve 53 which is in registry with the slot 61 will be cammed inwardly against the action of the spring 54 as the protruding portion of the valve engages the web 64 thus opening the air port 51 of the sound chamber 34. Continued outward movement will cause the valve 53 to align with the slot 62 permitting the spring to urge the valve 53 into closed relation with the air port 51 thereby interrupting the sound until the valve 53 engages the web 65 to cam the valve inwardly and again open the air port. The further outward movement aligning the valve 53 with the slot 63 permits the valve to be again seated to close the air port 51 thus causing a succession of intermittent articulated sounds upon outward movement of the plunger to simulate the word "pa-pa" due to the different pitch of the sounding reed 36 and the difference in the lengths of the webs 64 and 65 with reference to the lengths of the webs 59 and 60.

What is claimed is:

1. An articulate sound producing device including a pair of slidably interfitted tubular members having closed outer ends, the inner member having an inner end wall, transversely spaced reversely arranged sounding reeds extending therethrough, a partition extending longitudinally of said inner member between the inner end wall and closed outer end and subdividing said inner member into a pair of sound chambers into each of which one of the reeds protrudes and each having a lateral air port, the outer member having longitudinally spaced sets of apertures respectively adapted to cooperate with the air ports of the inner member to effect emission of articulate sounds upon relative movement of the members in opposite directions.

2. An articulate sound producing device including a pair of slidably interfitted tubular members having closed outer ends, the inner member having an inner end wall, transversely spaced reversely arranged distinctively pitched sounding reeds extending therethrough, a partition extending longitudinally of said inner member between the inner end wall and closed outer end and subdividing said inner member into a pair of sound chambers into each of which one of the reeds protrudes and each having a lateral air port, the outer member having longitudinally spaced sets of relatively different sized apertures respectively adapted to cooperate with the air ports of the inner member to effect the emission of relatively different articulate sounds upon relative movement of the members in opposite directions.

3. In a device for producing articulate sounds, a tubular housing having a closed outer end, a tubular element of lesser cross sectional size and length than the housing arranged concentrically within the opposite end thereof, a plunger including a tubular body slidably fitted within said tubular element, a manipulating head closing the outer end of said plunger body, means closing the inner end of the plunger body consisting of an internal annular wall adjacent the inner end thereof having a hollow frusto-conical inwardly tapered flange and a transverse wall within said flange, a longitudinal partition within said plunger body extending from the plunger head to the transverse wall and subdividing the plunger body into a pair of sound chambers each having an air port in the outer wall thereof, a pair of reversely directed sounding reeds secured to and extending through said transverse wall and protruding into the sound chambers respectively, a flexible tubing sealed at one end to the closed end of the housing and sealed at its opposite end to the inner end of the plunger body to define a pressure chamber, means for normally urging the plunger outwardly to distend the flexible tubing, and means controlled by movement of said plunger body for effecting openings and closings of the air port of one of the sounding chambers when the plunger body is moved in one direction to effect the operation of the sounding reed protruding into said sound chamber and the emission of articulate sounds through the air port in said chamber and to effect openings and closings of the air port of the other chamber when the tubular plunger is moved in the opposite direction for effecting the operation of the sounding reed projecting thereinto and the emission of articulate sounds through the air port in said other sound chamber.

4. An articulate sound producing device including a pair of slidably interfitted tubular members having closed outer ends, the inner member having an inner end wall, transversely spaced reversely arranged distinctively pitched sounding reeds extending therethrough, a diametrically disposed partition extending longitudinally of said inner member between the inner end wall and closed outer end and subdividing said inner member into a pair of sound chambers into each of which one of the reeds protrudes and each having a lateral air port, the outer member having longitudinally spaced sets of apertures respectively adapted to cooperate with the air ports of the inner member to effect emission of articulate sounds upon relative movement of the members in opposite directions.

5. In a device for producing articulate sounds, a tubular housing having a closed end, a tubular element of lesser cross sectional size and length than the housing arranged concentrically within the opposite end thereof, and having longitudinally spaced pairs of apertures disposed diametrically opposite each other, a plunger including a tubular body having diametrically opposite air ports adapted to respectively register with the pairs of apertures in the tubular element, said plunger body being slidably fitted within said tubular element, a manipulating head closing the outer end of said plunger body, a wall at the inner end thereof, a diametrically disposed partition extending longitudinally of the plunger body from the head to the inner end wall, a pair of transversely spaced reversely directed sounding reeds secured to and extending through said inner end wall, a flexible tubing sealed at one end to the closed end of the housing and sealed at its opposite end to the inner end of the plunger body to define a pressure chamber, and means for normally urging the plunger outwardly to distend the flexible tubing.

6. In a device for producing articulate sounds, a tubular body, a manipulating head closing the outer end of said body, a transverse wall closing the inner end thereof, a longitudinal partition within said body extending from the manipulating head to said transverse wall and subdividing the body into a pair of sound chambers each having an air port in the outer wall thereof, a pair of reversely directed sounding reeds secured to and extending through said transverse wall and protruding into the sound chambers respectively, a flexible tubing closed at one end and sealed at its opposite end to the inner end of said body to define a pressure chamber, means for normally urging said tubular body outwardly with reference to the closed end of the flexible tubing to distend the same, and means controlled by the movement of said tubular body for effecting openings and closings of the air port of one of the sounding chambers when the body is moved in one direction to effect the operation of the sounding reed protruding into said sound chamber and the emission of articulate sounds through the air port in said chamber and for effecting openings and closings of the air port of the other chamber when the tubular body is moved in the opposite direction for effecting the operation of said sounding reed projecting thereinto and the emission of articulate sounds through the air port in said other sound chamber.

7. In a device for producing articulate sounds, a tubular body, a manipulating head closing the outer end of said body, a transverse wall closing the inner end thereof, a longitudinal partition within said body extending from the manipulating head to said transverse wall and subdividing the body into a pair of sound chambers each having an air port in the outer wall thereof, a pair of reversely directed sounding reeds secured to and extending through said transverse wall and protruding into the sound chambers respectively, a flexible tubing closed at one end and sealed at its opposite end to the inner end of said body to define a pressure chamber, means for normally urging said tubular body outwardly with reference to the closed end of the flexible tubing to distend the same, a spherical valve element for each air port normally closing the same, and means engaging with said valve elements upon movement of said tubular body for effecting multiple opening and closing of the air port of one sounding chamber when the tubular body is moved in one direction to effect the operation of the sounding reed protruding into said sound chamber and the emission of an articulate sound through the air port in said chamber and for effecting multiple opening and closing of the air port of the other chamber when the tubular body is moved in the opposite direction for effecting the operation of the sounding reed projecting thereinto and the emission of articulate sounds through the air port in said other sound chamber.

BEULAH LOUISE HENRY.